United States Patent
Wang et al.

(10) Patent No.: US 8,472,542 B1
(45) Date of Patent: Jun. 25, 2013

(54) METHOD, APPARATUS, AND SYSTEM FOR SIGNAL TRANSMISSION

(71) Applicant: Huawei Technologies Co., Ltd., Guangdong (CN)

(72) Inventors: Rui Wang, Shenzhen (CN); Sheng Liu, Shenzhen (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/624,260

(22) Filed: Sep. 21, 2012

Related U.S. Application Data

(63) Continuation of application No. PCT/CN2012/075784, filed on May 19, 2012.

(30) Foreign Application Priority Data

Feb. 29, 2012 (CN) .......................... 2012 1 0050074

(51) Int. Cl.
*H04K 1/10* (2006.01)
(52) U.S. Cl.
USPC ........... 375/260; 375/262; 375/265; 375/267; 375/340; 375/343; 375/346; 375/347; 375/350
(58) Field of Classification Search
USPC ................ 375/260, 262, 265, 267, 340, 343, 375/346, 347, 350; 370/203, 204, 205, 207, 370/208, 209, 210
See application file for complete search history.

(56) References Cited

U.S. PATENT DOCUMENTS

| | | | |
|---|---|---|---|
| 7,729,232 | B2 | 6/2010 | Wang et al. |
| 8,078,185 | B2 | 12/2011 | Sun et al. |
| 8,259,641 | B2 * | 9/2012 | Anderson et al. ............. 370/316 |
| 2007/0082692 | A1 | 4/2007 | Tirkkonen et al. |

(Continued)

FOREIGN PATENT DOCUMENTS

| | | | |
|---|---|---|---|
| CN | 1983918 | A | 6/2007 |
| CN | 101305529 | A | 11/2008 |
| CN | 102158310 | A | 8/2011 |
| WO | WO 2011/431191 | * | 4/2011 |

OTHER PUBLICATIONS

International Search Report and Written Opinion of the International Searching Authority in corresponding International Patent Application No. PCT/CN2012/075784 (Dec. 6, 2012).

*Primary Examiner* — Dhaval Patel
(74) *Attorney, Agent, or Firm* — Leydig, Voit & Mayer, Ltd.

(57) ABSTRACT

Embodiments of the present invention provide a method, an apparatus, and a system for signal transmission. The method includes: obtaining, by a base station, a high-power precoding matrix and a low-power precoding matrix according to channel quality information, precoding a corresponding high-power signal stream according to the high-power precoding matrix respectively to obtain a first signal stream, precoding a corresponding low-power signal stream according to the low-power precoding matrix respectively to obtain a second signal stream, superimposing the first signal stream and the second signal stream to obtain one or more superimposed signal streams and transmitting the one or more superimposed signal streams to user terminals; decoding, by the user terminals, the received one or more superimposed signal streams by using receiving matrices, and obtaining signal streams that the user terminals need. The embodiments of the present invention are applicable to signal transmission in a Multiple-Input Multiple-output system.

16 Claims, 4 Drawing Sheets

U.S. PATENT DOCUMENTS

2007/0291867 A1* 12/2007 Khan et al. .................... 375/267
2010/0046644 A1    2/2010 Mazet
2010/0296428 A1   11/2010 Ho
2012/0195264 A1*  8/2012 Taoka et al. ................... 370/328

* cited by examiner

METHOD, APPARATUS, AND SYSTEM FOR SIGNAL TRANSMISSION

CROSS-REFERENCE TO RELATED APPLICATIONS

This application is a continuation of International Patent Application No. PCT/CN2012/075784, filed on May 19, 2012, which claims priority to Chinese Patent Application No. 201210050074.7, filed on Feb. 29, 2012, both of which are hereby incorporated by reference in their entireties.

FIELD OF THE INVENTION

The present invention relates to the field of communications technologies, and in particular to a method, an apparatus, and a system for signal transmission.

BACKGROUND OF THE INVENTION

The multiple-input multiple-output (Multiple-Input Multiple-output, MIMO) technology can enhance the capacity of a wireless channel by several times without increasing the system bandwidth and antenna transmission power, which therefore becomes a key technology in the future wireless communications.

In a method for signal transmission implemented in a multiple-input multiple-output system in the prior art, assuming that a base station has two transmitting antennas serving one or more users, the base station transmits two signal streams (one high-power signal stream and one low-power signal stream) to the one or more users. The two signal streams are directly formed into two same superimposed signal streams on the two transmitting antennas in the same superimposing manner, which are transmitted to a user terminal at the same time. The user terminal demodulates one of the one or more superimposed signal streams to obtain the signal stream that the user terminal needs.

In the process of implementing the signal transmission, after the two signal streams are directly superimposed, two antennas transmit two same superimposed signal streams, which not only wastes antenna resources but also decreases signal receiving quality as the user only uses one superimposed signal stream to demodulate the signal stream that the user needs.

SUMMARY OF THE INVENTION

Embodiments of the present invention provide a method, an apparatus, and a system for signal transmission, in which signals can be superimposed into multiple different superimposed signal streams in different superimposing manners, thereby enhancing signal receiving quality and improving system performance.

Embodiments of the present invention employ the following technical solutions.

A method for signal transmission, which includes:

obtaining a high-power precoding matrix and a low-power precoding matrix according to channel quality information;

precoding, according to the high-power precoding matrix, a high-power signal stream that needs to be transmitted to obtain a first precoded signal stream, in which the high-power signal stream is a signal stream that is transmitted to a user at the edge of a cell;

precoding, according to the low-power precoding matrix, a low-power signal stream that needs to be transmitted to obtain a second precoded signal stream, in which the low-power signal stream is a signal stream that is transmitted to a user at the center of a cell;

superimposing the first signal stream and the second signal stream to obtain one or more superimposed signal streams; and transmitting the one or more superimposed signal streams to user terminals, in which the user terminals include a receiving terminal of the user at the edge of the cell and a receiving terminal of the user at the center of the cell.

A method for signal transmission, which includes:

receiving one or more superimposed signal streams and receiving matrices transmitted by a base station; in which the superimposed signal streams include a precoded and superimposed high-power signal stream and a precoded and superimposed low-power signal stream; and the receiving matrices include a high-power interference matrix and a low-power receiving matrix;

decoding the one or more superimposed signal streamsone according to the high-power interference matrix to obtain a preliminary estimation of the high-power signal stream;

demodulating the preliminary estimation of the high-power signal stream and modulating the demodulated preliminary estimation again to obtain a precise estimation of the high-power signal stream; and after eliminating the precise estimation of the high-power signal from the one or more superimposed signal streams, obtaining, by using the low-power receiving matrix, a low-power signal stream that a receiving terminal of the user at the center of the cell needs.

A base station is provided, which includes:

a calculation unit, configured to obtain a high-power precoding matrix and a low-power precoding matrix according to channel quality information;

a precoding unit, configured to precode, according to the high-power precoding matrix, a high-power signal stream that needs to be transmitted to obtain a first precoded signal stream, in which the high-power signal stream is a signal stream that is transmitted to a user at the edge of a cell; precode, according to the low-power precoding matrix, a low-power signal stream that needs to be transmitted to obtain a second precoded signal stream, in which the low-power signal stream is a signal stream that is transmitted to a user at the center of a cell;

a superimposing unit, configured to superimpose the first signal stream and the second signal stream that are obtained by performing the precoding performed by the precoding unit to obtain one or more superimposed signal streams; and a transmission unit, configured to transmit the one or more superimposed signal streams obtained by performing the superimposing performed by the superimposing unit to user terminals, in which the user terminals include a receiving terminal of the user at the edge of the cell and a receiving terminal of the user at the center of the cell.

A user terminal, which includes:

a receiving unit, configured to receive one or more superimposed signal streams and receiving matrices transmitted by a base station; in which the one or more superimposed signal streams include a precoded and superimposed high-power signal stream and a precoded and superimposed low-power signal stream; and the receiving matrices include a high-power interference matrix and a low-power receiving matrix;

a decoding unit, configured to decode the one or more superimposed signal streams according to the high-power interference matrix to obtain a preliminary estimation of the high-power signal stream;

a modulation unit, configured to demodulate the preliminary estimation of the high-power signal stream and modulate the demodulated preliminary estimation again to obtain a precise estimation of the high-power signal stream; and a signal obtaining unit, configured to: after eliminating the precise estimation of the high-power signal from the one or more superimposed signal streams, obtain, by using the low-power receiving matrix, a low-power signal stream that a receiving terminal of the user at the center of the cell needs.

A system, which includes: a base station and user terminals.

The base station is the foregoing base station; and the user terminals are the foregoing user terminal.

The embodiments of the present invention provide a method, an apparatus, and a system for signal transmission. A base station obtains a high-power precoding matrix and a low-power precoding matrix according to channel quality information, precodes the corresponding high-power signal stream according to the high-power precoding matrix respectively to obtain a first signal stream, precodes the corresponding low-power signal stream according to the low-power precoding matrix respectively to obtain a second signal stream, and superimposes the first signal stream and the second signal stream to obtain one or more superimposed signal streams and transmit the one or more superimposed signal streams to user terminals; and the user terminals decode the received one or more superimposed signal streams by using receiving matrices, and obtain signal streams that the user terminals need. In the method, signals are superimposed and transmitted in different superimposing manners according to different channel quality, thereby enhancing signal receiving quality and improving system performance.

DETAILED DESCRIPTION OF THE EMBODIMENTS

The following describes the technical solutions of the embodiments of the present invention clearly and completely with reference to the accompanying drawings in the embodiments of the present invention. Evidently, the described embodiments are only some exemplary embodiments of the present invention, rather than all embodiments of the present invention. All other embodiments obtained by persons of ordinary skill in the art based on the embodiments of the present invention without creative efforts shall fall within the protection scope of the present invention.

The embodiments of the present invention are applicable to a multi-antenna communication system, and in this system, a base station communicates with a user terminal through a channel.

Embodiment 1

Figure 1:
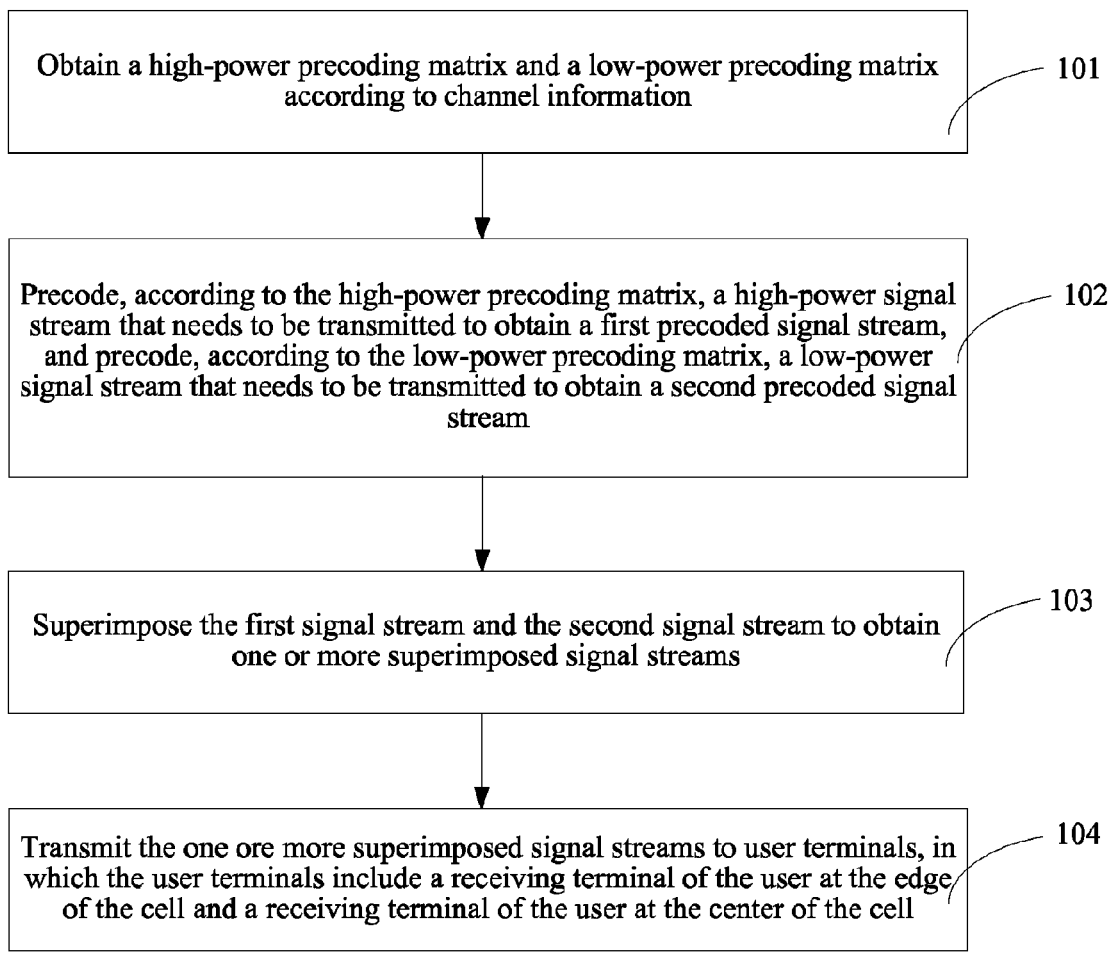
FIG. 1 is a flow chart of a method for signal transmission provided in Embodiment 1.

An embodiment of the present invention provides a method for signal transmission, and the method is executed by a base station. As shown in FIG. 1, the method includes the following steps:

101. Obtain a high-power precoding matrix and a low-power precoding matrix according to channel quality information.

The channel quality information includes a high-power channel matrix corresponding to a receiving terminal of the user at the edge of the cell and a low-power channel matrix corresponding to a receiving terminal of the user at the center of the cell. A high-power receiving terminal is configured to receive a high-power signal stream the transmission power of which is higher than first preset power, and a low-power receiving terminal is configured to receive a low-power signal stream the transmission power of which is not higher than second preset power, in which the first preset power is not lower than the second preset power. The first preset power and the second preset power are set according to specific conditions, which are not limited here.

The base station serves two types of user terminal: one type of user terminal is a receiving terminal of the user at the edge of the cell whihc is usually located at the edge position of a cell served by the base station and the terminal is configured to receive a high-power signal stream; and the other type of user terminal is a receiving terminal of the user at the center of the cell which is usually located at the central position of a cell served by the base station and the terminal is configured to receive a low-power signal stream. There is corresponding channel quality information between each user terminal and the base station, and the channel quality information includes a channel matrix. The base station calculates the high-power precoding matrix for precoding the high-power signal stream and the low-power precoding matrix for precoding the low-power signal stream according to the high-power channel matrix corresponding to the receiving terminal of the user at the edge of the cell and the low-power channel matrix corresponding to the receiving terminal of the user at the center of the cell.

The base station serves the number (A+B) of user terminals in total, in which the user terminals include A receiving terminals of the user at the edge of the cells and B receiving terminals of the user at the center of the cells. According to A high-power channel matrices HH1, HH2, . . . , and HHA and B low-power channel matrices HL1, HL2, . . . , and HLB of the user terminals, the base station can calculate A high-power precoding matrices P1, P2, . . . , and PA corresponding to the A receiving terminals of the user at the edge of the cells and B low-power precoding matrices S1, S2, . . . , and SB corresponding to the B receiving terminals of the user at the center of the cells.

102. Precode, according to the high-power precoding matrix, a high-power signal stream that needs to be transmitted to obtain a first precoded signal stream, and precode, according to the low-power precoding matrix, a low-power signal stream that needs to be transmitted to obtain a second precoded signal stream.

The high-power signal stream is a signal stream that is transmitted to a user at the edge of a cell; and the low-power signal stream is a signal stream that is transmitted to a user at the center of a cell.

The base station precodes a high-power signal stream transmitted to the receiving terminal of the user at the edge of the cell according to the high-power precoding matrix corresponding to a high-power signal stream received by the receiving terminal of the user at the edge of the cell to obtain a first signal stream; precodes a low-power signal stream transmitted to the receiving terminal of the user at the center of the cell according to the low-power precoding matrix corresponding to a low-power signal stream received by the receiving terminal of the user at the center of the cell to obtain a second signal stream. The high-power signal stream and the low-power signal stream are digital signal streams generated after being modulated and encoded by the base station.

Assuming that the base station serves the number (A+B) of user terminals in total, in which the user terminals include A receiving terminals of the user at the edge of the cells and B receiving terminals of the user at the center of the cells. The A high-power signal streams XH1, XH2, . . . , and XHA that the A receiving terminals of the user at the edge of the cells need to receive are precoded according to calculated A high-power precoding matrices P1, P2, . . . , and PA corresponding to the A receiving terminals of the user at the edge of the cells to obtain a first signal stream, and the B low-power signal streams XL1, XL2, . . . , and XLB that the B receiving terminals of the user at the center of the cells need to receive are precoded according to calculated B low-power precoding matrices S1, S2, . . . , and SB corresponding to the B receiving terminals of the user at the center of the cells to obtain a second signal stream.

If the base station has four transmitting antennas, the first signal stream generated after the A high-power signal streams has been precoded has four signals, the A high-power signal streams are modulated in each signal in different superimposing manners; similarly, the second signal stream also has four signals, and all the B low-power signal streams are also modulated in each signal in different superimposing manners. The superimposing manners are different because the precoding matrices obtained according to different channel matrices corresponding to the receiving terminals are different, and the channel matrices reflect channel quality between the base station and the user terminals, so that the superimposing manners are different because of different channel quality, that is, the precoding means to superimpose signals in different superimposing manners according to different channel quality.

103. Superimpose the first signal stream and the second signal stream to obtain one or more superimposed signal streams.

Still assuming that the base station has four transmitting antennas, four signals in the first signal stream and four signals in the second signal stream are superimposed two by two, that is, one signal in the first signal stream is superimposed to one signal in the second signal stream, so that the one or more superimposed signal streams obtained by performing superimposing also have four signals, and each signal in the one or more superimposed signal streams contains A high-power signal streams and B low-power signal streams superimposed in different manners.

104. Transmit the one or more superimposed signal streams to user terminals, in which the user terminals include a receiving terminal of the user at the edge of the cell and a receiving terminal of the user at the center of the cell.

The base station transmits the four signals in the one or more superimposed signal streams to the receiving terminal of the user at the edge of the cell and the receiving terminal of the user at the center of the cell through the four transmitting antennas.

Figure 2:
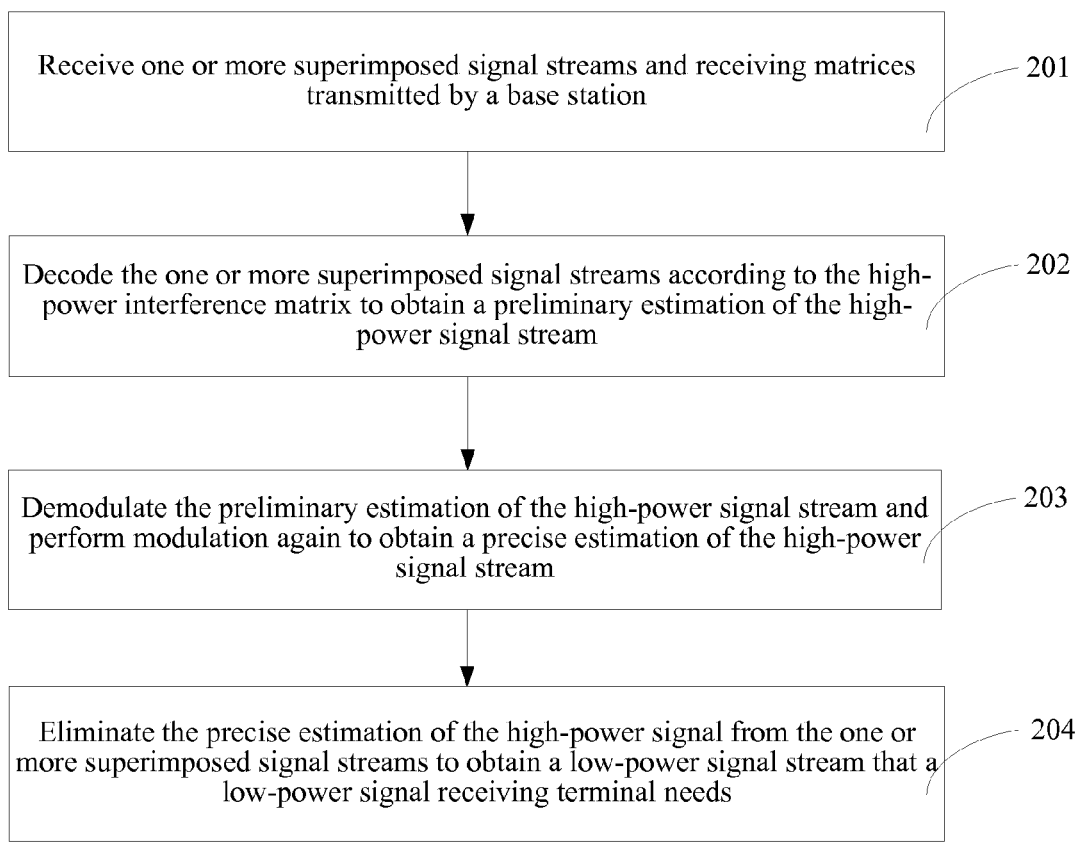
FIG. 2 is a schematic flow chart of another method for signal transmission provided in Embodiment 1.

An embodiment of the present invention provides a method for signal transmission, and the method is executed by a user terminal. As shown in FIG. 2, the method includes the following steps:

201. Receive one or more superimposed signal streams and receiving matrices transmitted by a base station.

The one or more superimposed signal streams include a precoded and superimposed high-power signal stream and a precoded and superimposed low-power signal stream. The base station first precodes the high-power signal stream and the low-power signal stream by using their respective corresponding precoding matrices, then performs superimposing to generate one or more superimposed signal streams, and then transmits the one or more superimposed signal streams to the user terminal through the transmitting antennas of the base station.

Here, the user terminal is a low-power user terminal, the receiving matrices are calculated by the base station and then transmitted by the base station to the user terminal, and the receiving matrices include a high-power interference matrix and a low-power receiving matrix.

If the user terminal is a receiving terminal of the user at the edge of the cell, the user terminal receives a corresponding high-power receiving matrix, and if the user terminal is a receiving terminal of the user at the center of the cell, the user terminal receives a corresponding high-power interference matrix and the low-power receiving matrix.

Certainly, the user terminal may also calculate the receiving matrix by itself, and in this case, the user terminal needs to measure, by itself, the channel quality information that the receiving matrix needs, that is, the channel matrices, and then calculates the receiving matrix according to the precoding matrix information transmitted by the base station. The specific calculation formula is the same as the calculation formula used by the base station to calculate the receiving matrices, which is not described in detail here.

202. Decode the one or more superimposed signal streams according to the high-power interference matrix to obtain a preliminary estimation of the high-power signal stream.

The ith receiving terminal of the user at the center of the cell receives an original signal which is as follows:

$$Y_{Li} = H_{Li}SiX_{Li} + \sum_{j \neq i} H_{Li}SjX_{Lj} + \sum_{j=1}^{B} H_{Li}PjX_{Hj} + Z_{Li},$$

in which $Z_{Li}$ is channel noise corresponding to the channel matrix $H_{Li}$ of the ith receiving terminal of the user at the edge of the cell. $TiY_{Li}$ is a preliminary estimation of the high-power signal stream.

Alternatively, the receiving terminal of the user at the center of the cell may use the Maximum Likelihood Detection (ML, maximum likelihood detection) manner to obtain a preliminary estimated value of a preliminary estimation of the high-power signal, and at this time, the receiving matrices do not need to be used.

203. Demodulate the preliminary estimation of the high-power signal stream and modulate the demodulated preliminary estimation again to obtain a precise estimation of the high-power signal stream.

The preliminary estimation of the high-power signal stream is demodulated and modulated again to obtain a precise estimation of the high-power signal stream, which is marked as $\hat{X}_{Hj}$.

204. After eliminating the precise estimation of the high-power signal from the one or more superimposed signal streams, obtain, by using the low-power receiving matrix, a low-power signal stream that a receiving terminal of the user at the center of the cell needs.

The specific formula of obtaining a low-power signal stream required by the terminal for receiving the ith low-power signal stream is $W_i(Y_{Li} - \sum_{j=1}^{A} H_{Li} P_j \hat{X}_{Hi})$, and similarly, the receiving terminal of the user at the center of the cell also needs to demodulate and decode the low-power signal stream to obtain information represented by low-power signal stream $XL_i$.

The embodiment of the present invention provides a method for signal transmission, in which a base station obtains a high-power precoding matrix and a low-power precoding matrix according to channel quality information, precodes the corresponding high-power signal stream according to the high-power precoding matrix to obtain a first signal stream, precodes the corresponding low-power signal stream according to the low-power precoding matrix to obtain a second signal stream, superimposes the first signal stream and the second signal stream, and transmits the obtained one or more superimposed signal streams to a user terminal; the user terminal decodes the received one or more superimposed signal streams by using receiving matrices, and obtains signal streams that the user terminal needs; and in this method, signals are superimposed and transmitted in different superimposing manners according to different channel quality, thereby enhancing signal receiving quality and improving system performance.

Embodiment 2

Figure 3:
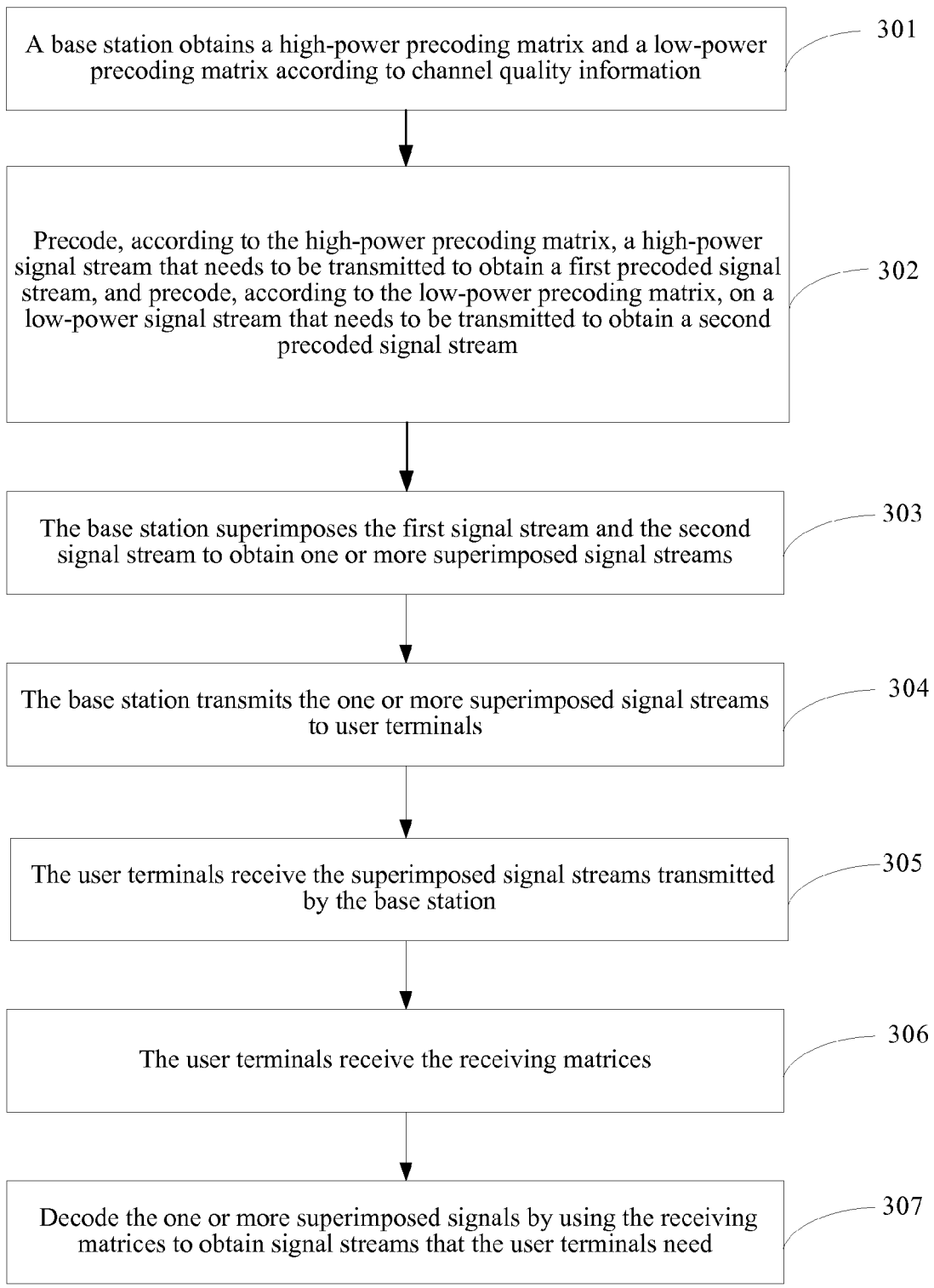
FIG. 3 is a schematic flow chart of a method for signal transmission provided in Embodiment 2.

An embodiment of the present invention provides a method for signal transmission. As shown in FIG. 3, the method includes the following steps:

301. A base station obtains a high-power precoding matrix and a low-power precoding matrix according to channel quality information.

The channel quality information includes a high-power channel matrix corresponding to a receiving terminal of the user at the edge of the cell and a low-power channel matrix corresponding to a receiving terminal of the user at the center of the cell; a high-power receiving terminal is configured to receive a high-power signal stream the transmission power of which is first power, and a low-power receiving terminal is configured to receive a low-power signal stream the transmission power of which is second power; and the first power is higher than the second power.

The base station serves two types of user terminal: one type of user terminal is a receiving terminal of the user at the edge of the cell which is usually located at the edge position of a cell served by the base station and the terminal is configured to receive a high-power signal stream; and the other type of user terminal is a receiving terminal of the user at the center of the cell which is usually located at the central position of a cell served by the base station and the terminal is configured to receive a low-power signal stream. There is corresponding channel quality information between each user terminal and the base station, and the channel quality information includes a channel matrix. The base station calculates the high-power precoding matrix for precoding the high-power signal stream and the low-power precoding matrix for precoding the low-power signal stream according to the high-power channel matrix corresponding to the receiving terminal of the user at the edge of the cell and the low-power channel matrix corresponding to the receiving terminal of the user at the center of the cell.

Assuming that the base station serves the number (A+B) of user terminals in total, the user terminals include A receiving terminals of the user at the edge of the cells and B receiving terminals of the user at the center of the cells. According to A high-power channel matrices HH1, HH2, ..., and HHA and B low-power channel matrices HL1, HL2, ..., and HLB of the user terminals, the base station can calculate A high-power precoding matrices P1, P2, ..., and PA corresponding to the A receiving terminals of the user at the edge of the cells and B low-power precoding matrices S1, S2, ..., and SB corresponding to the B receiving terminals of the user at the center of the cells.

Specifically, the obtaining a high-power precoding matrix and a low-power precoding matrix according to channel quality information includes the following steps:

S1. Allocate power to the high-power signal stream and the low-power signal stream according to k preset power values, in which the k power values are marked as $a_1, a_2, \ldots,$ and $a_k$, each of the power values are smaller than 1 and the values are arranged in descending order, the upper limit power allcated to the high-power signal stream is $$\frac{1}{1+a_m}E,$$

the upper limit power allcated to the low-power signal stream is $$\frac{a_m}{1+a_m}E,$$

E is the total power of the base station, m is greater than or equal to 1 and smaller than or is equal to k.

S2. Calculate a high-power precoding preliminary matrix, a low-power precoding preliminary matrix, a high-power receiving preliminary matrix, a high-power interference preliminary matrix and a low-power receiving preliminary matrix according to the channel quality information while ensuring that the power for transmitting the high-power signal stream is smaller than or equal to $$\frac{1}{1+a_m}E,$$

and the power for transmitting the low-power signal stream is smaller than or equal to $$\frac{a_m}{1+a_m}E.$$

First, calculate B low-power precoding preliminary matrices S1*, S2*, ..., and SB* and B low-power receiving preliminary matrices W1*, W2*, ..., and WB* corresponding to the B receiving terminals of the user at the center of the cells. The calculation method may adopt an existing algorithm of a multi-user MIMO transceiver, and calculation is performed based on the transmission power $$\frac{a_m}{1+a_m}E$$

of the base station.

Then, calculate A high-power precoding preliminary matrices P1*, P2*, ..., and PA* and A high-power receiving preliminary matrices Q1*, Q2*, . . . , and QA* corresponding to the A receiving terminals of the user at the edge of the cells. The calculation method may adopt an existing algorithm of a multi-user MIMO transceiver, and calculation is performed based on $$\frac{1}{1+a_m}E$$

of the base station. The interference from the transmission of B low-power signal streams is regarded as the interference from signals of adjacent cells.

Finally, the B low-power signal streams transmitted to the B receiving terminals of the user at the center of the cells are regarded as interference, and an existing receiver algorithm is employed to calculate B high-power interference preliminary matrices T1*, T2*, . . . , and TB* used by the B receiving terminals of the user at the center of the cells for receiving the high-power signal streams.

Specifically, when there are only one high-power receiving terminal and one low-power receiving terminal, calculate a high-power precoding preliminary matrix and a high-power receiving preliminary matrix that are corresponding to a high-power receiving terminal, and the specific steps of calculating a low-power precoding preliminary matrix, the high-power interference preliminary matrix and the low-power receiving preliminary matrix that are corresponding to the low-power receiving terminal are as follows:

a. Calculate a low-power precoding preliminary matrix S1, and the S1 meets the following formula:

$$S_1 = V_L \begin{bmatrix} \sqrt{q_1} & \cdots & 0 & \cdots & 0 \\ \cdots & \cdots & & \cdots & \cdots \\ 0 & \cdots & \sqrt{q_i} & \cdots & 0 \\ \cdots & \cdots & & \cdots & \cdots \\ 0 & \cdots & 0 & \cdots & \sqrt{q_{M_L}} \end{bmatrix}$$

in which, the matrix $V_L$ is a matrix formed of singular vectors corresponding to $M_L$ maximum singular values of the matrix $I_L^{-1/2}H_L$, $I_L$ is a covariance matrix of noise received by the receiving terminal of the user at the center of the cell and interference from other base stations, $H_L$ is the low-power channel matrix, $$q_i = \max\left(0, \mu\lambda_i^{\frac{1}{2}} - \lambda_i^{-1}\right),$$

is the ith greatest singular value of matrix $H'_L I^{-1} H_L$, $H'_L$ is a conjugate transpose matrix of $H_L$, and μ is a maximum value ensuring that $$\sum_{i=1}^{M_L} q_i$$

is smaller than or equal to $$\frac{a_m}{1+a_m}E.$$

That is, the upper limit power value allocated to the low-power signal stream affects the low-power precoding preliminary matrix $S_1$ through the value of μ.

b. Obtain a corresponding low-power receiving preliminary matrix W1 according to the low-power precoding preliminary matrix S1.

Here, the receiver corresponding to the low-power receiving preliminary matrix is a receiver that employs the linear MMSE (linear minimum mean-square error) receiving criterion, so $W_1 = S'_1 H'_L (H_L S_1 S'_1 H_L + I_L)^{-1}$, in which $S'_1$ is a conjugate transpose matrix of the low-power precoding preliminary matrix $S_1$, and $I_L$ is a covariance matrix of noise at the receiving terminal of the user at the center of the cell and interference from other base stations.

c. Calculate the high-power precoding preliminary matrix P1, and the P1 satisfies the following formula:

$$P_1 = V_H \begin{bmatrix} \sqrt{t_1} & \cdots & 0 & \cdots & 0 \\ \cdots & \cdots & & \cdots & \cdots \\ 0 & \cdots & \sqrt{t_i} & \cdots & 0 \\ \cdots & \cdots & & \cdots & \cdots \\ 0 & \cdots & 0 & \cdots & \sqrt{t_{M_H}} \end{bmatrix}$$

in which, $V_H$ is a matrix formed of singular vectors corresponding to $M_H$ maximum singular values of the matrix $(H_H S_1 S'_1 H'_H + I_H)^{-1/2} H_H$, $H_H$ is a high-power channel matrix, $H'_H$ is a conjugate transpose matrix of $H_H$, $S'_1$ is a conjugate transpose matrix of the low-power precoding preliminary matrix $S_1$, $I_H$ is a covariance matrix of noise at the receiving terminal of the user at the edge of the cell and interference from other base stations;

$$ti = \max\left(0, \delta\rho_i^{-\frac{1}{2}} - \rho_i^{-1}\right),$$

$\rho_i$ is the ith greatest singular values of $H'_H(H_H S_1 S'_1 H'_H + I_H)^{-1} H_H$, and δ is a maximum value ensuring that $$\sum_{i=1}^{M_H} t_i$$

is smaller than or equal to $$\frac{1}{1+a_m}E.$$

That is, the upper limit power value allocated to the high-power signal stream affects the high-power precoding preliminary matrix P1 through the value of δ.

d. Obtain a high-power receiving preliminary matrix Q1 according to the high-power precoding preliminary matrix P1 and the low-power precoding preliminary matrix S1.

Here, the receiver corresponding to the high-power receiving preliminary matrix is a receiver that employs the linear MMSE receiving criterion, so $Q_1 = P'_1 H'_H (H_H S_1 S'_1 H'_H + H_H P_1 P'_1 H'_H + I_H)^{-1}$, in which $P'_1$ is a conjugate transpose matrix of low-power precoding preliminary matrix $P_1$, and $I_H$ is a covariance matrix of noise at the receiving terminal of the user at the edge of the cell and interference from other base stations.

e. Calculate a high-power interference preliminary matrix T1 according to the high-power precoding preliminary matrix P1, the high-power receiving preliminary matrix Q1, the low-power precoding preliminary matrix S1 and the low-power receiving preliminary matrix W1.

Specifically, the formula of calculating the high-power interference preliminary matrix T1 is:

$$T_1 = P'_1 H'_L (H_L S_1 S'_1 H'_L + H_L P_1 P'_1 H'_L + I_L)^{-1}.$$

The high-power precoding preliminary matrix P1, the low-power precoding preliminary matrix S1, the high-power receiving preliminary matrix Q1, the high-power interference preliminary matrix T1, and the low-power receiving preliminary matrix W1 are already calculated according to the channel quality information while ensuring that the power of the high-power signal stream is smaller than or equal to $$\frac{1}{1+a_m} E,$$

the power for transmitting the low-power signal stream is smaller than or is equal to $$\frac{a_m}{1+a_m} E.$$

S3. Calculate a mean Signal to Interference plus Noise Ratio or a mean-square error of all usable signals at the receiving terminal of the user at the edge of the cells according to the high-power precoding preliminary matrices, low-power precoding preliminary matrices, high-power receiving preliminary matrices, high-power interference preliminary matrices and low-power receiving preliminary matrices.

The base station calculates a mean Signal to Interference plus Noise Ratio or a mean-square error of all usable signals at the receiving terminal of the user at the edge of the cells according to the calculated high-power precoding preliminary matrices P1*, P2*, ..., and PA*, low-power precoding preliminary matrices S1*, S2*, ..., and SB*, high-power receiving preliminary matrices Q1*, Q2*, ..., and QA*, high-power interference preliminary matrices T1*, T2*, ..., and TB* and low-power receiving preliminary matrices W1*, W2*, ..., and WB*. Here, either the mean Signal to Interference plus Noise Ratio or the mean-square error of the usable signals may be calculated, which depends on a specific situation.

S4. Determine whether the mean Signal to Interference plus Noise Ratio is higher than a preset Signal to Interference plus Noise Ratio threshold, or whether the mean-square error is lower than a preset mean-square error threshold or whether m is equal to k.

S5. If the mean Signal to Interference plus Noise Ratio is higher than the preset Signal to Interference plus Noise Ratio threshold or the mean-square error is lower than the preset mean-square error threshold or m is equal to k, set the high-power precoding preliminary matrix and the low-power precoding preliminary matrix as the high-power precoding matrix and the low-power precoding matrix, respectively.

If m is not equal to k and one of the two cases: the mean Signal to Interference plus Noise Ratio is lower than the preset Signal to Interference plus Noise Ratio threshold and the mean-square error is higher than the preset mean-square error threshold, take a next value in descending order for am, the power continues to be allocated to the high-power signal stream and the low-power signal stream till the high-power precoding matrix and the low-power precoding matrix that satisfy the following condition are obtained: the mean Signal to Interference plus Noise Ratio is higher than the preset Signal to Interference plus Noise Ratio threshold or the mean-square error is lower than the preset mean-square error threshold or m is equal to k.

While setting the high-power precoding preliminary matrix and the low-power precoding preliminary matrix as the high-power precoding matrix and the low-power precoding matrix, respectively, the base station sets the high-power receiving preliminary matrix, the high-power interference preliminary matrix, and the low-power receiving preliminary matrix as the high-power receiving matrix, the high-power interference matrix, and the low-power receiving matrix, respectively, and transmits the high-power receiving matrix, the high-power interference matrix, and the low-power receiving matrix to corresponding user terminals.

302. Precode, according to the high-power precoding matrix, a high-power signal stream that needs to be transmitted to obtain a first precoded signal stream, and precode, according to the low-power precoding matrix, a low-power signal stream that needs to be transmitted to obtain a second precoded signal stream.

The low-power signal stream is a signal stream that is transmitted to a user at the center of a cell; in which the high-power signal stream is a signal stream that is transmitted to a user at the edge of a cell.

The base station precodes a high-power signal stream transmitted to the receiving terminal of the user at the edge of the cell according to the high-power precoding matrix corresponding to a high-power signal stream received by the receiving terminal of the user at the edge of the cell to obtain a first signal stream; and precodes a low-power signal stream transmitted to the receiving terminal of the user at the center of the cell according to the low-power precoding matrix corresponding to a low-power signal stream received by the receiving terminal of the user at the center of the cell to obtain a second signal stream. The high-power signal stream and the low-power signal stream are digital signal streams generated after being modulated and encoded by the base station.

Assuming that the base station serves the number (A+B) of user terminals in total, the user terminals include A receiving terminals of the user at the edge of the cells and B receiving terminals of the user at the center of the cells. The A high-power signal streams XH1, XH2, ..., and XHA that A receiving terminals of the user at the edge of the cells need to receive are precoded according to calculated A high-power precoding matrices P1, P2, ..., and PA corresponding to the A receiving terminals of the user at the edge of the cells, so as to obtain a first signal stream, and the B low-power signal streams XL1, XL2, ..., and XLB that B receiving terminals of the user at the center of the cells need to receive are precoded according to calculated B low-power precoding matrices S1, S2, ..., and SB corresponding to the B receiving terminals of the user at the center of the cells, so as to obtain a second signal stream.

Assuming that the base station has four transmitting antennas, the first signal stream generated after the A high-power signal streams have been precoded has four signals, and the A high-power signal streams are modulated in each signal in different superimposing manners; similarly, the second signal stream also has four signals, the B low-power signal streams are also modulated in each signal in different superimposing manners. The superimposing manners are different because precoding matrices obtained according to different channel matrices corresponding to the receiving terminals are different, and the channel matrices reflect the channel quality of the base station and the user terminals, so that the superimposing manners are different due to different channel quality, that is, the precoding here means to superimpose signals in different superimposing manners according to different channel quality.

The number of high-power signal streams in each type of high-power signal streams XH1, XH2, . . . , or XHA is different, and the sum of the numbers of the high-power signal streams in all high-power signal streams XH1, XH2, . . . , and XHA should be smaller than or equal to the number of transmitting antennas, namely, 4. The number of low-power signal streams in each type of low-power signal streams XL1, XL2, . . . , or XLB is different, and the sum of the numbers of low-power signal streams in all low-power signal streams XL1, XL2, . . . , and XLB is smaller than or equal to the number of transmitting antennas, namely, 4.

Each type of high-power signal streams and each type of low-power signal streams are digital signal streams generated after being modulated and encoded by the base station, the number of signal streams in the type of high-power signal stream XH1 is 2, that is, the high-power signal stream XH1 is a (2×1) matrix, and a corresponding high-power precoding matrix P1 is a (4×2) matrix, so that a (4×1) matrix is obtained after encoding is performed based on (P1×XH1). The precoded matrices of all the high-power signal streams are superimposed to obtain a first signal stream which is a (4×1) matrix, that is, four signals. Similarly, the number of low-power signal streams in the type of low-power signal stream XL1 is 3, that is, the low-power signal stream XL1 is a (3×1) matrix, S is a (3×ML) matrix, so that after encoding is performed based on (S×XL), a (4×1) matrix is obtained, and the precoded matrices of all the low-power signal streams are superimposed to obtain a second signal stream, which is a (4×1) matrix, that is, four signals.

303. The base station superimposes the first signal stream and the second signal stream to obtain one or more superimposed signal streams.

The four signals in the first signal stream and the four signals in the second signal stream are superimposed two by two, that is, one signal in the first signal stream and one signal in the second signal stream are superimposed, so that four one or more superimposed signal streams are obtained through superimposing, and each superimposed signal stream contains a high-power signal stream and a low-power signal stream superimposed in different manners.

304. The base station transmits the one or more superimposed signal streams to user terminals.

The user terminals include a receiving terminal of the user at the edge of the cell and a receiving terminal of the user at the center of the cell. The base station transmits the four signals in the one or more superimposed signal streams to the receiving terminal of the user at the edge of the cell and the receiving terminal of the user at the center of the cell through four transmitting antennas.

305. The user terminals receive the one or more superimposed signal streams transmitted by the base station.

The one or more superimposed signal streams include a precoded and superimposed high-power signal stream and a precoded and superimposed low-power signal stream.

If the user terminal is a receiving terminal of the user at the edge of the cell, the needed number of high-power signal streams that the receiving terminal of the user at the edge of the cell needs is MH, and NH is greater than or equal to MH.

If the user terminal is a receiving terminal of the user at the center of the cell, the number of antennas of the receiving terminal of the user at the center of the cell is NL, the number of low-power signal streams that the receiving terminal of the user at the center of the cell needs is ML, NL is greater than or equal to ML, NL is greater than or equal to M, and M is a total number of the high-power signal streams in the one or more superimposed signal streams.

306. The user terminals receive the receiving matrices.

The receiving matrices are calculated by the base station and then transmitted by the base station to the user terminals, and the receiving matrices include a high-power receiving matrix, or a high-power interference matrix and a low-power receiving matrix.

If the user terminal is a receiving terminal of the user at the edge of the cell, the user terminal receives the corresponding high-power receiving matrix, and if the user terminal is a receiving terminal of the user at the center of the cell, the user terminal receives their respective corresponding high-power interference matrix and low-power receiving matrix.

Certainly, the user terminal may also calculate the receiving matrix by itself, and in this case, the user terminal needs to measure, by itself, the channel quality information that the receiving matrix needs, that is, the channel matrices, and then calculates the receiving matrix according to the precoding matrix information transmitted by the base station. The specific calculation formula is the same as the calculation formula used by the base station to calculate the receiving matrices, which is not described in detail here.

307. Decode the one or more superimposed signal streams by using the receiving matrices, and obtain signal streams that the user terminals need.

After receiving the one or more superimposed signal streams through the receiving antennas, the user terminals decode the one or more superimposed signal streams by using the receiving matrices, and obtain signal streams that the user terminals need. That is, the receiving terminal of the user at the edge of the cell obtains the high-power signal stream it needs, or the receiving terminal of the user at the center of the cell obtains the low-power signal stream it needs.

Assuming the channel matrix corresponding to the ith receiving terminal of the user at the edge of the cell is HHi, the high-power signal stream transmitted to the ith receiving terminal of the user at the edge of the cell by the base station is XHi, the corresponding ith high-power precoding matrix is Pi; the channel matrix corresponding to the ith receiving terminal of the user at the center of the cell is HLi, the high-power signal stream transmitted to the ith receiving terminal of the user at the center of the cell by the base station is XLi, and the corresponding ith low-power precoding matrix is Si.

Specifically, if the user terminal is a receiving terminal of the user at the edge of the cell, the one or more superimposed signal streams are decoded by using the high-power receiving matrix, and the high-power signal stream that the receiving terminal of the user at the edge of the cell needs is obtained.

The original signal received by the ith receiving terminal of the user at the edge of the cell is:

$$Y_{Hi} = H_{Hi}PiX_{Hi} + \sum_{j \neq i} H_{Hi}PjX_{Hj} + \sum_{j=1}^{B} H_{Hi}SjX_{Lj} + Z_{Hi},$$

in which $Z_{Hi}$ is channel noise of a channel matrix $H_{Hi}$ corresponding to the ith receiving terminal of the user at the edge of the cell. The high-power receiving matrix of a precoding matrix Pi corresponding to the ith high-power signal terminal is Qi, and $QiY_{Hi}$ is used as an estimated value of the high-power signal stream $X_{Hi}$ to obtain the high-power signal stream that the ith receiving terminal of the user at the edge of the cell needs.

If the user terminal is a receiving terminal of the user at the center of the cell, a low-power signal stream that a receiving terminal of the user at the center of the cell needs should be obtained through the following steps.

Q1. Decode the one or more superimposed signal streams according to the high-power interference matrix to obtain a preliminary estimation of the high-power signal stream.

The original signal received by the ith receiving terminal of the user at the center of the cell is:

$$Y_{Li} = H_{Li}SiX_{Li} + \sum_{j \neq i} H_{Li}SjX_{Lj} + \sum_{j=1}^{B} H_{Li}PjX_{Hj} + Z_{Li}$$

in which $Z_{Li}$ is channel noise of the channel matrix $H_{Li}$ corresponding to the ith receiving terminal of the user at the edge of the cell. $TiY_{Li}$ is used as a preliminary estimation of the high-power signal stream.

Alternatively, the receiving terminal of the user at the center of the cell may obtain a preliminary estimated value of the preliminary estimation of the high-power signal in a Maximum Likelihood Detection manner, and at this time the receiving matrices do not need to be used.

Q2. Demodulate and decode the preliminary estimation of the high-power signal stream and perform encoding and modulate the demodulated preliminary estimation again to obtain a precise estimation of the high-power signal stream.

The preliminary estimation of the high-power signal stream is demodulated and modulated again to obtain the precise estimation of the high-power signal stream, which is marked as $\hat{X}_{Hij}$.

Q3. After eliminating the precise estimation of the high-power signal stream from the superimposed signal, obtain, by using the low-power receiving matrix, a low-power signal stream that a receiving terminal of the user at the center of the cell needs.

The specific formula of obtaining the low-power signal stream that the ith low-power signal stream receiving terminal needs is $Wi(Y_{Li} - \sum_{j=1}^{A} H_{Li}P_j\hat{X}_{Hi})$, and similarly, the receiving terminal of the user at the center of the cell also needs to demodulate and decode the low-power signal stream to obtain information represented by a low-power signal stream XLi.

As discussed above, when there are only one receiving terminal of the user at the edge of the cell and one low-power receiving terminal, the superimposed signal received by the receiving terminal of the user at the edge of the cell is $Y_H = H_H P_1 X_H + H_H S_1 X_L + Z_H$ (ZH is channel noise between the receiving terminal of the user at the edge of the cell and the base station), and the receiving terminal of the user at the edge of the cell can calculate the estimated value of a high-power signal stream XH that the receiving terminal of the user at the edge of the cell needs through QYH. The superimposed signal received by the receiving terminal of the user at the center of the cell is $Y_L = H_L P_1 X_H + H_L S_1 X_L + Z_L$ (ZL is channel noise between the receiving terminal of the user at the center of the cell and the base station), and T1YL is used as a preliminary estimation of the high-power signal. The preliminary estimation of the high-power signal stream is demodulated and modulated again to obtain the precise estimation of the high-power signal stream, which is marked as $\hat{X}_H$. The specific formula of obtaining the low-power signal stream is $W(Y_L - H_L P_1 \hat{X}_H)$.

Specifically, the method is applicable to the following scenarios:

A base station has four transmitting antennas, and the base station serves two user terminals, in which user terminal A is a receiving terminal of the user at the edge of the cell, and user terminal B is a receiving terminal of the user at the center of the cell, and user terminal A is usually located at the edge position of a cell served by the base station. Assuming A has two receiving antennas, and user terminal B is usually located at the central position of a cell served by the base station, and assuming that B has four receiving antennas, the base station transmit two high-power signal streams to A and transmits three low-power signal streams to B.

First, the base station precodes two high-power signal streams that are already modulated into digital signals by using high-power precoding matrices corresponding to A to obtain four high-power signals, and each high-power signal among the four high-power signals contains two high-power signal streams that are already modulated into digital signals. In addition, three low-power signal streams that are already modulated into digital signals are precoded by using the low-power precoding matrices corresponding to B to obtain four low-power signals, and each low-power signal among the four low-power signals contains three low-power signal streams that are already modulated into digital signals.

Then, the four high-power signals and the four low-power signals are superimposed two by two, that is, one high-power signal and one low-power signal are superimposed, so that the obtained one or more superimposed signal streams have four superimposed signals, and the four antennas of the base station transmit the four signals to A and B at the same time through corresponding channels, user terminal A receives the signals through two receiving antennas, and user terminal A decodes two high-power signal streams from the received signals by using its high-power signal receiving matrix. User terminal B receives signals through four receiving antennas, and user terminal B decodes three high-power signal streams from the received signals by using its high-power signal interference matrix and low-power signal receiving matrix.

Figure 4:
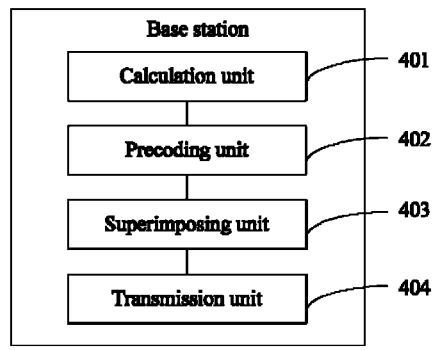
FIG. 4 is a schematic block diagram of a base station provided in Embodiment 2.

An embodiment of the present invention further provides a base station applicable to a wireless communication system. As shown in FIG. 4, the base station includes: a calculation unit 401, a precoding unit 402, a superimposing unit 403, and a transmission unit 404.

The calculation unit 401 obtains a high-power precoding matrix and a low-power precoding matrix according to channel quality information.

The channel quality information includes a high-power channel matrix corresponding to a receiving terminal of the user at the edge of the cell and a low-power channel matrix corresponding to a receiving terminal of the user at the center of the cell. A high-power receiving terminal is configured to receive a high-power signal stream the transmission power of which is first power, and a low-power receiving terminal is configured to receive a low-power signal stream the transmission power of which is second power; and the first power is higher than the second power.

The base station serves two types of user terminal: one type of user terminal is a receiving terminal of the user at the edge of the cell which is usually located at the edge position of a cell served by the base station and the terminal is configured to receive a high-power signal stream; and the other type of user terminal is a receiving terminal of the user at the center of the cell which is usually located at the central position of a cell served by the base station and the terminal is configured to receive a low-power signal stream. There is corresponding channel quality information between each user terminal and the base station, and the channel quality information includes a channel matrix. The base station calculates the high-power precoding matrix for precoding the high-power signal stream and the low-power precoding matrix for precoding the low-power signal stream according to the high-power channel matrix corresponding to the receiving terminal of the user at the edge of the cell and the low-power channel matrix corresponding to the receiving terminal of the user at the center of the cell.

Assuming that, in this embodiment, the base station serves the number (A+B) of user terminals, in which the user terminals include A receiving terminals of the user at the edge of the cells and B receiving terminals of the user at the center of the cells. According to A high-power channel matrices HH1, HH2, . . . , and HHA and B low-power channel matrices HL1, HL2, . . . , and HLB of the user terminals, the base station can calculate A high-power precoding matrices P1, P2, . . . , and PA corresponding to the A receiving terminals of the user at the edge of the cells and B low-power precoding matrices S1, S2, . . . , and SB corresponding to the B receiving terminals of the user at the center of the cells.

Specifically, the obtaining the high-power precoding matrix and the low-power precoding matrix according to channel quality information involves steps S1 to S5, which are already described in detail in the foregoing, which is not described here.

The precoding unit 402 is configured to precode, according to the high-power precoding matrix, a high-power signal stream that needs to be transmitted to obtain a first precoded signal stream, and precode, according to the low-power precoding matrix, a low-power signal stream that needs to be transmitted to obtain a second precoded signal stream.

The high-power signal stream is a signal stream that is transmitted to a user at the edge of a cell; and the low-power signal stream is a signal stream that is transmitted to a user at the center of a cell.

The base station precodes a high-power signal stream transmitted to the receiving terminal of the user at the edge of the cell according to the high-power precoding matrix corresponding to a high-power signal stream received by the receiving terminal of the user at the edge of the cell to obtain a first signal stream; and precodes a low-power signal stream transmitted to the receiving terminal of the user at the center of the cell according to the low-power precoding matrix corresponding to a low-power signal stream received by the receiving terminal of the user at the center of the cell to obtain a second signal stream. The high-power signal stream and the low-power signal stream are digital signal streams generated after being modulated and encoded by the base station.

Still assuming that the base station serves the number (A+B) of user terminals in total, the user terminals include A receiving terminals of the user at the edge of the cells and B receiving terminals of the user at the center of the cells. The A high-power signal streams XH1, XH2, . . . , and XHA that A receiving terminals of the user at the edge of the cells need to receive are precoded according to calculated A high-power precoding matrices P1, P2, . . . , and PA corresponding to the A receiving terminals of the user at the edge of the cells, so as to obtain a first signal stream, and the B low-power signal streams XL1, XL2, . . . , and XLB that B receiving terminals of the user at the center of the cells need to receive are precoded according to calcuated B low-power precoding matrices S1, S2, . . . , and SB corresponding to the B receiving terminals of the user at the center of the cells, so as to obtain a second signal stream.

Assuming that in this embodiment the base station has four transmitting antennas, the first signal stream generated after the A high-power signal streams have been precoded has four signals, and the A high-power signal streams are modulated in each signal in different superimposing manners; similarly, the second signal stream also has four signals, the B low-power signal streams are also modulated in each signal in different superimposing manners. The superimposing manners are different because the precoding matrices obtained according to different channel matrices corresponding to the various receiving terminals are different, and the channel matrices reflect channel quality between the base station and user terminals, so that the superimposing manners are different because of different channel quality, that is, the precoding here is to superimpose signals in different superimposing manners according to different channel quality.

The number of high-power signal streams in each type of high-power signal streams XH1, XH2, . . . , or XHA is different, and the sum of the numbers of high-power signal streams in all the high-power signal streams XH1, XH2, . . . , and XHA should be smaller than or equal to the number of transmitting antennas, namely, 4. The number of low-power signal streams in each type of low-power signal streams XL1, XL2, . . . , and XLB is different, and the sum of the numbers of the low-power signal streams of all the low-power signal streams XL1, XL2, . . . , and XLB is smaller than or equal to the number of transmitting antennas, namely, 4.

Each type of high-power signal streams and each type of low-power signal streams are digital signal streams generated after being modulated and encoded by the base station, the number of signal streams in the type of high-power signal stream XH1 is 2, that is, the high-power signal stream XH1 is a (2×1) matrix, and a corresponding high-power precoding matrix P1 is a (4×2) matrix, so that a (4×1) matrix is obtained after encoding is performed based on (P1×XH1), the precoded matrices of all the high-power signal streams are superimposed to obtain a first signal stream, which is a (4×1) matrix, that is, four signals. Similarly, the number of low-power signal streams in the type of low-power signal stream XL1 is 3, that is, the low-power signal stream XL1 is a (3×1) matrix, S is a (3×ML) matrix, so that a (4×1) matrix is obtained after encoding is performed based on (S X XL), and the precoded matrices of all the low-power signal streams are superimposed to obtain a second signal stream, which is a (4×1) matrix, that is, four signals.

The superimposing unit 403 is configured to superimpose the first signal stream and the second signal stream to obtain one or more superimposed signal streams.

The superimposing unit 403 superimposes four signals in the first signal stream and four signals in the second signal stream two by two, that is, one signal in the first signal stream and one signal in the second signal stream are superimposed, so that four one or more superimposed signal streams are obtained through superimposing, and each superimposed signal stream contains a high-power signal stream and a low-power signal stream superimposed in a different form.

The transmission unit 404 is configured to transmit the one or more superimposed signal streams to user terminals, in which the user terminals include a receiving terminal of the user at the edge of the cell and a receiving terminal of the user at the center of the cell.

The user terminals include the receiving terminal of the user at the edge of the cell and the receiving terminal of the user at the center of the cell. The base station transmits the four signals in the one or more superimposed signal streams to the receiving terminal of the user at the edge of the cell and the receiving terminal of the user at the center of the cell through four transmitting antennas.

Figure 5:
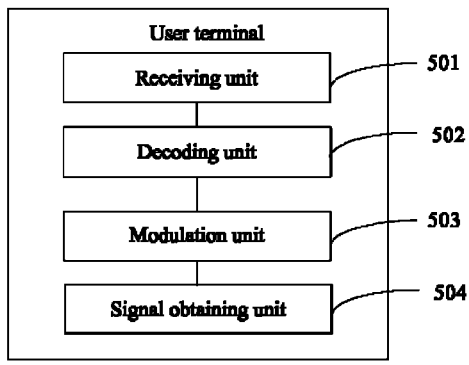
FIG. 5 is a schematic block diagram of a user terminal provided in Embodiment 2.

An embodiment of the present invention further provides a user terminal As shown in FIG. 5, the user terminal includes a receiving unit 501, a decoding unit 502, a modulation unit 503, and a signal obtaining unit 504.

The receiving unit 501 is configured to receive one or more superimposed signal streams and receiving matrices transmitted by a base station; in which the one or more superimposed signal streams include a precoded and superimposed high-power signal stream and a precoded and superimposed low-power signal stream; the receiving matrices are calculated by the base station and then transmitted by the base station to the user terminal, and the receiving matrices include a high-power interference matrix and a low-power receiving matrix.

The one or more superimposed signal streams include a precoded and superimposed high-power signal stream and a precoded and superimposed low-power signal stream; the base station first precodes the high-power signal stream and low-power signal stream by using their respective corresponding precoding matrices, then performs superimposing to generate one or more superimposed signal streams, and then transmits the one or more superimposed signal streams to the user terminal through the transmitting antennas of the base station.

Here, the user terminal is a low-power user terminal, the receiving matrices are calculated by the base station and then transmitted by the base station to the user terminal, and the receiving matrices are a high-power interference matrix and a low-power receiving matrix.

If the user terminal is a receiving terminal of the user at the edge of the cell, the user terminal receives a corresponding high-power receiving matrix, and if the user terminal is a receiving terminal of the user at the center of the cell, the user terminal receives a corresponding high-power interference matrix and low-power receiving matrix.

Certainly, the user terminal may also calculate the receiving matrix by itself. In this case, the user terminal needs to measure measure, by itself, the channel quality information that the receiving matrix needs, that is, the channel matrices, and then calculates the receiving matrix according to the precoding matrix information transmitted by the base station. The specific calculation formula is the same as the calculation formula used by the base station to calculate the receiving matrices, which is not described in detail here.

The decoding unit 502 is configured to decode the one or more superimposed signal streams according to the high-power interference matrix to obtain a preliminary estimation of the high-power signal stream.

The original signal of received by the ith receiving terminal of the user at the center of the cell is:

$$Y_{Li} = H_{Li}SiX_{Li} + \sum_{j \neq i} H_{Li}SjX_{Lj} + \sum_{j=1}^{B} H_{Li}PjX_{Hj} + Z_{Li},$$

in which $Z_{Li}$ is channel noise of the channel matrix $H_{Li}$ corresponding to the ith receiving terminal of the user at the edge of the cell. $TiY_{Li}$ is used as the preliminary estimation of the high-power signal stream.

Alternatively, the receiving terminal of the user at the center of the cell may use the Maximum Likelihood Detection (ML, maximum likelihood detection) manner to obtain a preliminary estimated value of the preliminary estimation of the high-power signal, and at this time, the receiving matrices do not need to be used.

The modulation unit 503 is configured to demodulate the preliminary estimation of the high-power signal stream and modulate the demodulated preliminary estimation again to obtain a precise estimation of the high-power signal stream.

The preliminary estimation of the high-power signal stream is demodulated and modulated again to obtain a precise estimation of the high-power signal stream, which is marked as $\hat{X}_{Hj}$.

The signal obtaining unit 504 is configured to: after eliminating the precise estimation of the high-power signal from the one or more superimposed signal streams, obtain, by using the low-power receiving matrix, a low-power signal stream that a receiving terminal of the user at the center of the cell needs.

The specific formula of obtaining the low-power signal stream that the ith low-power signal stream receiving terminal needs is $Wi\ (Y_{Li} - \sum_{j=1}^{A} H_{Li}P_j\hat{X}_{Hi})$, and similarly, the receiving terminal of the user at the center of the cell also needs to demodulate and decode the low-power signal stream to obtain information represented by low-power signal stream $X_{Li}$.

In addition, if the user terminal is a receiving terminal of the user at the edge of the cell, the superimposed signal is decoded by using the high-power receiving matrix to obtain a high-power signal stream that the receiving terminal of the user at the edge of the cell needs.

Figure 6:
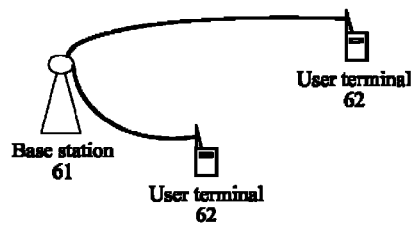
FIG. 6 is a schematic structural view of a system provided in Embodiment 2.

An embodiment of the present invention further provides a system. As shown in FIG. 6, the system includes a base station 61 and user terminals 62.

The base station 61 is configured to obtain a high-power precoding matrix and a low-power precoding matrix according to channel quality information, precode the high-power signal stream according to the high-power precoding matrix to obtain a first signal stream, precode the low-power signal stream according to the low-power precoding matrix to obtain a second signal stream, superimpose the first signal stream and the second signal stream to obtain one or more superimposed signal streams and transmit the one or more superimposed signal streams to the user terminals.

The user terminals 62 are configured to receive, through receiving antennas, the one or more superimposed signal streams transmitted by the base station, and decode the one or more superimposed signal streams by using the receiving matrices to obtain signal streams that the user terminals need.

The user terminals 62 include two types: a receiving terminal of the user at the edge of the cell and a receiving terminal of the user at the center of the cell.

If the user terminal 62 is a receiving terminal of the user at the edge of the cell, the superimposed signal is directly decoded by using the high-power receiving matrix to obtain a high-power signal stream that the receiving terminal of the user at the edge of the cell needs.

If the user terminal 62 is a receiving terminal of the user at the center of the cell, the user terminal 62 needs to decode the superimposed signal according to the high-power interference matrix to obtain a preliminary estimation of the high-power signal, demodulate and decode the preliminary estimation of the high-power signal stream and encode and modulate the preliminary estimation again to obtain a precise estimation of the high-power signal stream, and after eliminating the precise estimation of the high-power signal from the superimposed signal, obtain, by using the low-power receiving matrix, a low-power signal stream that a receiving terminal of the user at the center of the cell needs.

The embodiments of the present invention provide a method, an apparatus, and a system for signal transmission, in which a base station obtains a high-power precoding matrix and a low-power precoding matrix according to channel quality information, precodes a high-power signal stream according to the high-power precoding matrix to obtain a first signal stream, precodes a low-power signal stream respectively according to the low-power precoding matrix to obtain a second signal stream, superimposes the first signal stream and the second signal stream to obtain one or more superimposed signal streams and transmits the one or more superimposed signal streams to the user terminals. The user terminals decode the received one or more superimposed signal streams by using receiving matrices, and obtain signal streams that the user terminals need. In the method, the signals are superimposed and transmitted according to different channel quality in different superimposing manners, thereby enhancing signal receiving quality and improving system performance.

Persons of ordinary skill in the art should understand that all or a part of the steps of the method according to the embodiments may be implemented by a program instructing relevant hardware. The program may be stored in a computer readable storage medium. When the program is run, the steps of the method according to the embodiments are performed. The storage medium may be any medium that is capable of storing program codes, such as a ROM, a RAM, a magnetic disk or an optical disk.

What is claimed is:

1. A method for signal transmission, comprising:
   obtaining, by a Base Station (BS), a high-power precoding matrix and a low-power precoding matrix according to channel quality information;
   precoding, by the BS, according to the high-power precoding matrix, a high-power signal stream that needs to be transmitted to obtain a first precoded signal stream, wherein the high-power signal stream is a signal stream that is transmitted to a user at the edge of a cell;
   precoding, by the BS, according to the low-power precoding matrix, a low-power signal stream that needs to be transmitted to obtain a second precoded signal stream, wherein the low-power signal stream is a signal stream that is transmitted to a user at the center of a cell;
   superimposing the first signal stream and the second signal stream to obtain one or more superimposed signal streams; and
   transmitting, by the BS, the one or more superimposed signal streams to user terminals, wherein the user terminals comprise a receiving terminal of the user at the edge of the cell and a receiving terminal of the user at the center of the cell.

2. The method according to claim 1, wherein the obtaining a high-power precoding matrix and a low-power precoding matrix according to channel quality information comprises:
   allocating power to the high-power signal stream and the low-power signal stream according to k preset power values, wherein the k power values are marked as a1, a2, ..., and ak, each of the power value is smaller than 1 and the values are arranged in descending order, upper limit power allcated to the high-power signal stream is $$\frac{1}{1+a_m}E,$$

upper limit power allocated to the low-power signal stream is $$\frac{a_m}{1+a_m}E,$$

E is total power of the base station, and m is greater than or equal to 1 and is smaller than or equal to k;
   calculating a high-power precoding preliminary matrix, a low-power precoding preliminary matrix, a high-power receiving preliminary matrix, a high-power interference preliminary matrix, and a low-power receiving preliminary matrix according to the channel quality information while ensuring that power for transmitting the high-power signal stream is smaller than or equal to $$\frac{1}{1+a_m}E$$

and power for transmitting the low-power signal stream is smaller than or equal to $$\frac{a_m}{1+a_m}E;$$

calculating a mean Signal to Interference plus Noise Ratio or a mean-square error of all usable signals at the receiving terminal of the user at the edge of the cell according to the high-power precoding preliminary matrix, the low-power precoding preliminary matrix, the high-power receiving preliminary matrix, the high-power interference preliminary matrix, and the low-power receiving preliminary matrix;
   determining whether the mean Signal to Interference plus Noise Ratio is higher than a preset Signal to Interference plus Noise Ratio threshold, or whether the mean-square error is lower than a preset mean-square error threshold or whether m is equal to k;
   if the mean Signal to Interference plus Noise Ratio is higher than the preset Signal to Interference plus Noise Ratio threshold or the mean-square error is lower than preset mean-square error threshold or m is equal to k, setting the high-power precoding preliminary matrix and the low-power precoding preliminary matrix as the high-power precoding matrix and the low-power precoding matrix, respectively; and
   if m is not equal to k and one of the two cases: the mean Signal to Interference plus Noise Ratio is lower than the preset Signal to Interference plus Noise Ratio threshold and the mean-square error is higher than the preset mean-square error threshold, taking a next value in descending order for am, continuing allcating power to the high-power signal stream and the low-power signal stream, till the high-power precoding matrix and the low-power precoding matrix that satisfy the following condition is obtained: the mean Signal to Interference plus Noise Ratio is higher than the preset Signal to Interference plus Noise Ratio threshold or the mean-square error is lower than preset mean-square error threshold or m is equal to k.

3. The method according to claim 2, wherein if the mean Signal to Interference plus Noise Ratio is higher than the preset Signal to Interference plus Noise Ratio threshold or the mean-square error is lower than preset mean-square error threshold or m is equal to k, setting the high-power precoding preliminary matrix and low-power precoding preliminary matrix as the high-power precoding matrix and the low-power precoding matrix, respectively, further comprises:

setting the high-power receiving preliminary matrix, the high-power interference preliminary matrix, and the low-power receiving preliminary matrix as the high-power receiving matrix, the high-power interference matrix, and the low-power receiving matrix, respectively, and transmitting the high-power receiving matrix, the high-power interference matrix, and the low-power receiving matrix to the user terminals.

4. The method according to claim 1, wherein in the case that the user terminals comprise one receiving terminal of the user at the edge of the cell and one receiving terminal of the user at the center of the cell, the calculating a high-power precoding preliminary matrix, a low-power precoding preliminary matrix, a high-power receiving preliminary matrix, a high-power interference preliminary matrix, and a low-power receiving preliminary matrix according to the channel quality information while ensuring that the power for transmitting the high-power signal stream is smaller than or equal to $$\frac{1}{1+a_m}E$$

and the power for transmitting the low-power signal stream is smaller than or equal to $$\frac{a_m}{1+a_m}E,$$

specifically comprises:

calculating a low-power precoding preliminary matrix S1, wherein the S1 satisfies the following formula:

$$S_1 = V_L \begin{bmatrix} \sqrt{q_1} & \cdots & 0 & \cdots & 0 \\ \cdots & \cdots & & \cdots & \cdots \\ 0 & \cdots & \sqrt{q_i} & \cdots & 0 \\ \cdots & \cdots & & \cdots & \cdots \\ 0 & \cdots & 0 & \cdots & \sqrt{q_{M_L}} \end{bmatrix}$$

in which a matrix VL is a matrix formed of singular vectors corresponding to ML maximum singular values of a matrix $I_L^{1/2}H_L$, IL is a covariance matrix of noise received by the receiving terminal of the user at the center of the cell and interference from other base stations, HL is a low-power channel matrix, $$q_i = \max\left(0, \mu\lambda_i^{\frac{1}{2}} - \lambda_i^{-1}\right),$$

$\lambda_i$ is an ith greatest singular value of a matrix $H'_L I^{-1} H_L$, $H'_L$ is a conjugate transpose matrix of HL, $\mu$ is a maximum value ensuring that $$\sum_{i=1}^{M_L} q_i$$

is smaller than or equal to $$\frac{a_m}{1+a_m}E;$$

obtaining a corresponding low-power receiving preliminary matrix W1 according to the low-power precoding preliminary matrix S1;

calculating a high-power precoding preliminary matrix P1, wherein the P1 satisfies the following formula:

$$P_1 = V_H \begin{bmatrix} \sqrt{t_1} & \cdots & 0 & \cdots & 0 \\ \cdots & \cdots & & \cdots & \cdots \\ 0 & \cdots & \sqrt{t_i} & \cdots & 0 \\ \cdots & \cdots & & \cdots & \cdots \\ 0 & \cdots & 0 & \cdots & \sqrt{t_{M_H}} \end{bmatrix}$$

in which VH is a matrix formed of singular vectors corresponding to MH maximum singular values in a matrix $(H_H S_1 S'_1 H'_H + I_H)^{-1/2} H_H$, HH is a high-power channel matrix, $H'_H$ is a conjugate transpose matrix of HH, $S'_1$ is a conjugate transpose matrix of the low-power precoding preliminary matrix S1, IH is a covariance matrix of noise received by the cell edge user signal receiving terminal and interference from other base stations;

$$t_i = \max\left(0, \delta\rho_i^{\frac{1}{2}} - \rho_i^{-1}\right),$$

$\rho_i$ is the ith greatest singular value in $H'_H (H_H SS'H'_H + I_H)^{-1} H_H$, $\delta$ is a maximum value ensuring that $$\sum_{i=1}^{M_H} t_i$$

is smaller than or equal to $$\frac{1}{1+a_m}E;$$

obtaining a high-power receiving preliminary matrix Q1 according to the high-power precoding preliminary matrix P1 and the low-power precoding preliminary matrix S1; and calculating a high-power interference preliminary matrix T1 according to the high-power precoding preliminary matrix P1, the high-power receiving preliminary matrix Q1, the low-power precoding preliminary matrix S1, and the low-power receiving preliminary matrix W1.

5. The method according to claim 1, wherein the number of antennas of the receiving terminal of the user at the edge of the cell is NH, the needed number of high-power signal streams that the receiving terminal of the user at the edge of the cell needs is MH, and NH is greater than or equal to MH.

6. The method according to claim 1, wherein the number of antennas of the receiving terminal of the user at the center of the cell is NL, the number of low-power signal streams that the receiving terminal of the user at the center of the cell needs is ML, NL is greater than or equal to ML, NL is greater than or equal to M, M is a total number of the high-power signal streams in the one or more superimposed signal streams.

7. A method for signal transmission, comprising:
receiving one or more superimposed signal streams and receiving matrices transmitted by a base station; wherein the one or more superimposed signal streams comprise a precoded and superimposed high-power signal stream and a precoded and superimposed low-power signal stream; and the receiving matrices comprise a high-power interference matrix and a low-power receiving matrix;
decoding the one or more superimposed signal streams according to the high-power interference matrix to obtain a preliminary estimation of the high-power signal stream;
demodulating the preliminary estimation of the high-power signal stream and modulating the demodulated preliminary estimation again to obtain a precise estimation of the high-power signal stream; and
after eliminating the precise estimation of the high-power signal from the one or more superimposed signal streams, obtaining, by using the low-power receiving matrix, a low-power signal stream that a receiving terminal of the user at the center of the cell needs.

8. The method according to claim 7, wherein the number of antennas of the receiving terminal of the user at the center of the cell is NL, the number of low-power signal streams that the receiving terminal of the user at the center of the cell needs is ML, NL is greater than or equal to ML, NL is greater than or equal to M, M is a total number of high-power signal streams in the one or more superimposed signal streams.

9. A base station, comprising:
a calculation unit, configured to obtain a high-power precoding matrix and a low-power precoding matrix according to channel quality information;
a precoding unit, configured to precode, according to the high-power precoding matrix, a high-power signal stream that needs to be transmitted to obtain a first precoded signal stream, wherein the high-power signal stream is a signal stream that is transmitted to a user at the edge of a cell; precode, according to the low-power precoding matrix, a low-power signal stream that needs to be transmitted to obtain a second precoded signal stream, wherein the low-power signal stream is a signal stream that is transmitted to a user at the center of a cell;
a superimposing unit, configured to superimpose the first signal stream and the second signal stream that are obtained by performing the precoding performed by the precoding unit to obtain one or more superimposed signal streams; and
a transmission unit, configured to transmit the one or more superimposed signal streams obtained by performing the superimposing performed by the superimposing unit to user terminals, wherein the user terminals comprise a receiving terminal of the user at the edge of the cell and a receiving terminal of the user at the center of the cell.

10. The base station according to claim 9, wherein the calculation unit being configured to obtain a high-power precoding matrix and a low-power precoding matrix according to channel quality information specifically comprises:
allocating power to the high-power signal stream and the low-power signal stream according to k preset power values, wherein the k power values are marked as a1, a2, ..., and ak, each of the power values are smaller than 1 and the values are arranged in descending order, upper limit power allocated to the high-power signal stream is $$\frac{1}{1+a_m}E,$$

upper limit power allocated to the low-power signal stream is $$\frac{a_m}{1+a_m}E,$$

E is total power of the base station, and m is greater than or equal to 1 and is smaller than or equal to k;
calculating a high-power precoding preliminary matrix, a low-power precoding preliminary matrix, a high-power receiving preliminary matrix, a high-power interference preliminary matrix, and a low-power receiving preliminary matrix according to the channel quality information while ensuring that power for transmitting the high-power signal stream is smaller than or equal to $$\frac{1}{1+a_m}E$$

and power for transmitting the low-power signal stream is smaller than or equal to $$\frac{a_m}{1+a_m}E;$$

calculating a mean Signal to Interference plus Noise Ratio or a mean-square error of usable signals at the high-power signal receiving user according to the high-power precoding preliminary matrix, the low-power precoding preliminary matrix, the high-power receiving preliminary matrix, the high-power interference preliminary matrix, and the low-power receiving preliminary matrix;
determining whether the mean Signal to Interference plus Noise Ratio is higher than a preset Signal to Interference plus Noise Ratio threshold, or whether the mean-square error is lower than a preset mean-square error threshold or whether m is equal to k;
if the mean Signal to Interference plus Noise Ratio is higher than the preset Signal to Interference plus Noise Ratio threshold or the mean-square error is lower than preset mean-square error threshold or m is equal to k, setting the high-power precoding preliminary matrix and the low-power precoding preliminary matrix as the high-power precoding matrix and the low-power precoding matrix, respectively; and if m is not equal to k and one of the two cases: the mean Signal to Interference plus Noise Ratio is lower than the preset Signal to Interference plus Noise Ratio threshold and the mean-square error is higher than the preset mean-square error threshold, taking a next value in descending order for am, and continuing allocating power to the high-power signal stream and the low-power signal stream, till the high-power precoding matrix and the low-power precoding matrix that satisfy the following condition is obtained: the mean Signal to Interference plus Noise Ratio is higher than the preset Signal to Interference plus Noise Ratio threshold or the mean-square error is lower than preset mean-square error threshold or m is equal to k.

11. The base station according to claim 10, wherein if the mean Signal to Interference plus Noise Ratio is higher than the preset Signal to Interference plus Noise Ratio threshold or the mean-square error is lower than preset mean-square error threshold or m is equal to k, setting the high-power precoding preliminary matrix and the low-power precoding preliminary matrix as the high-power precoding matrix and the low-power precoding matrix, respectively further comprises:

setting the high-power receiving preliminary matrix, the high-power interference preliminary matrix, and the low-power receiving preliminary matrix as the high-power receiving matrix, the high-power interference matrix, and the low-power receiving matrix, respectively, and transmitting the high-power receiving matrix, the high-power interference matrix, and the low-power receiving matrix to the user terminals.

12. The base station according to claim 9, wherein in the case that the user terminals comprise one receiving terminal of the user at the edge of the cell and one receiving terminal of the user at the center of the cell, calculating the high-power precoding preliminary matrix, the low-power precoding preliminary matrix, the high-power receiving preliminary matrix, the high-power interference preliminary matrix, and the low-power receiving preliminary matrix according to the channel quality information while ensuring that the power for transmitting the high-power signal stream is smaller than or equal to $$\frac{1}{1+a_m}E$$

and the power for transmitting the low-power signal stream is smaller than or equal to $$\frac{a_m}{1+a_m}E,$$

specifically comprises:

calculating a low-power precoding preliminary matrix S1, wherein the S1 satisfies the following formula:

$$S_1 = V_L \begin{bmatrix} \sqrt{q_1} & \cdots & 0 & \cdots & 0 \\ \cdots & \cdots & & \cdots & \cdots \\ 0 & \cdots & \sqrt{q_i} & \cdots & 0 \\ \cdots & \cdots & & \cdots & \cdots \\ 0 & \cdots & 0 & \cdots & \sqrt{q_{M_L}} \end{bmatrix}$$

in which a matrix VL is a matrix formed of singular vectors corresponding to ML maximum singular values of a matrix $I_L^{1/2}H_L$, IL is a covariance matrix of noise received by the receiving terminal of the user at the center of the cell and interference from other base stations, HL is a low-power channel matrix, $$q_i = \max\left(0, \mu\lambda_i^{-\frac{1}{2}} - \lambda_i^{-1}\right),$$

λi is an ith greatest singular value of a matrix $H'_L I^{-1} H_L$, $H'_L$ is a conjugate transpose matrix of HL, μ is a maximum value ensuring that $$\sum_{i=1}^{M_L} q_i$$

is smaller than or equal to $$\frac{a_m}{1+a_m}E;$$

obtaining a low-power receiving preliminary matrix W1 according to the low-power precoding preliminary matrix S1;

calculating a high-power precoding preliminary matrix P1, wherein the P1 satisfies the following formula:

$$P_1 = V_H \begin{bmatrix} \sqrt{t_1} & \cdots & 0 & \cdots & 0 \\ \cdots & \cdots & & \cdots & \cdots \\ 0 & \cdots & \sqrt{t_i} & \cdots & 0 \\ \cdots & \cdots & & \cdots & \cdots \\ 0 & \cdots & 0 & \cdots & \sqrt{t_{M_H}} \end{bmatrix}$$

in which VH is a matrix formed of singular vectors corresponding to MH maximum singular values of a matrix $(H_H S_1 S'_1 H'^H + I_H)^{-1/2} H_H$, HH is a high-power channel matrix, $H'_H$ is a conjugate transpose matrix of HH, $S'_1$ is a conjugate transpose matrix of the low-power precoding preliminary matrix S1, IH is a covariance matrix of noise received by the receiving terminal of the user at the edge of the cell and interference from other base stations;

$$ti = \max\left(0, \delta\rho_i^{-\frac{1}{2}} - \rho_i^{-1}\right),$$

$\rho i$ is an ith greatest singular value of $(H'_H SS'H'_H + I_H)^{-1} H_H$, $\delta$ is a maximum value ensuring that $$\sum_{i=1}^{M_H} t_i$$

is smaller than or equal to $$\frac{1}{1+a_m} E;$$

obtaining a high-power receiving preliminary matrix Q1 according to the high-power precoding preliminary matrix P1 and the low-power precoding preliminary matrix S1; and calculating a high-power interference preliminary matrix T1 according to the high-power precoding preliminary matrix P1, the high-power receiving preliminary matrix Q1, the low-power precoding preliminary matrix S1, and the low-power receiving preliminary matrix W1.

13. The base station according to claim 9, wherein the number of antennas of the receiving terminal of the user at the edge of the cell is NH, the needed number of high-power signal streams that the receiving terminal of the user at the edge of the cell needs is MH, and NH is greater than or equal to MH.

14. The base station according to claim 9, wherein the number of antennas of the receiving terminal of the user at the edge of the cell is NL, the number of low-power signal streams that the receiving terminal of the user at the center of the cell needs is ML, NL is greater than or equal to ML, NL is greater than or equal to M, M is a total number of the high-power signal streams in the one or more superimposed signal streams.

15. A user terminal, comprising:
a receiving unit, configured to receive one or more superimposed signal streams and receiving matrices transmitted by a base station; wherein the one or more superimposed signal streams comprise a precoded and superimposed high-power signal stream and a precoded and superimposed low-power signal stream; and the receiving matrices comprise a high-power interference matrix and a low-power receiving matrix;
a decoding unit, configured to decode the one or more superimposed signal streams according to the high-power interference matrix to obtain a preliminary estimation of the high-power signal stream;
a modulation unit, configured to demodulate the preliminary estimation of the high-power signal stream and modulate the demodulated preliminary estimation again to obtain a precise estimation of the high-power signal stream; and
a signal obtaining unit, configured to: after eliminating the precise estimation of the high-power signal from the one or more superimposed signal streams, obtain, by using the low-power receiving matrix, a low-power signal stream that a receiving terminal of the user at the center of the cell needs.

16. The user terminal according to claim 15, wherein the number of antennas of the receiving terminal of the user at the center of the cell is NL, the number of low-power signal streams that the receiving terminal of the user at the center of the cell needs is ML, NL is greater than or equal to ML, NL is greater than or equal to M, and M is a total number of the high-power signal streams in the one or more superimposed signal streams.

* * * * *